May 3, 1932.   J. R. COOK   1,857,079
ELECTRIC RECEPTACLE AND HOUSING THEREFOR
Original Filed March 21, 1931
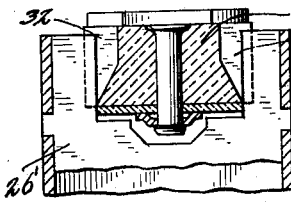
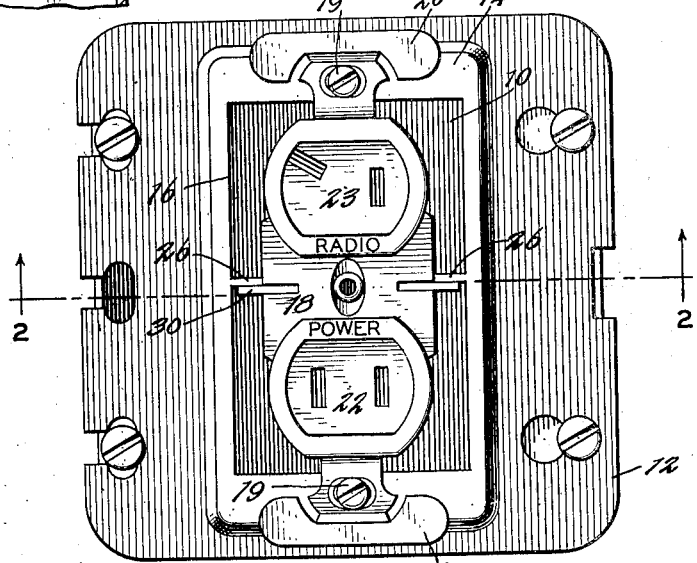
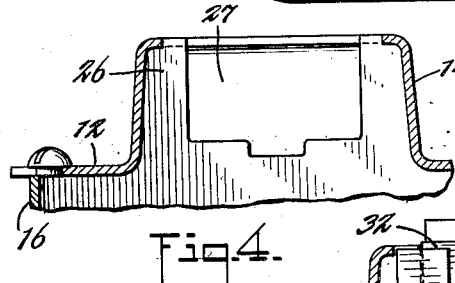
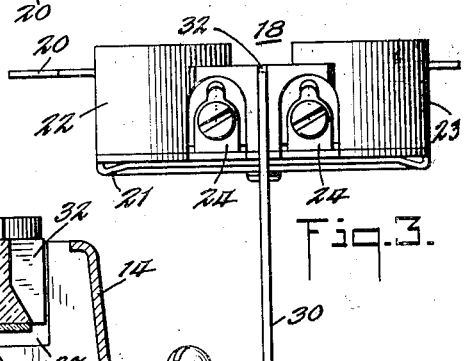
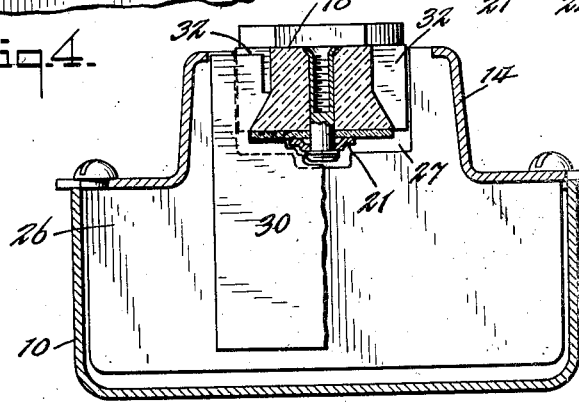
INVENTOR
JOHN R. COOK
by his attorneys Patented May 3, 1932

1,857,079

UNITED STATES PATENT OFFICE

JOHN R. COOK, OF HARTFORD, CONNECTICUT, ASSIGNOR TO THE ARROW-HART & HEGEMAN ELECTRIC COMPANY, OF HARTFORD, CONNECTICUT, A CORPORATION OF CONNECTICUT

ELECTRIC RECEPTACLE AND HOUSING THEREFOR

Application filed March 21, 1931, Serial No. 524,387. Renewed January 28, 1932.

This invention relates to the combination of an electrical fitting and a housing, the fitting being of the type having two electrical devices which are mutually insulated and adapted for connection to separate electrical systems. Suitable housings include outlet boxes and wall cases or, as they are sometimes called, switch boxes, and the like.

One example of the above type of electrical fitting which is now used is an attachment plug receptacle having more than one outlet, each outlet being insulated from the others so that one may be connected to a radio antenna and ground circuit and another to a power line, and so on.

Due to the underwriters' requirement it is not permissible to have separate systems in the same housing unless the electric apparatus and conductors of each system are separated from one another by a barrier connected to the box. One way of accomplishing this has been to secure a plate to the midsection of the receptacle, the plate extending in a plane transverse to the receptacle.

In the copending application of Norbert G. Haering, filed December 31, 1929, patented October 27th, 1931, Patent No. 1,829,648, is shown and claimed broadly a construction for a purpose similar to the purpose of the invention herein described. The present invention is an improvement over the Haering invention and insofar as the invention is claimed in said patent, I make no claim to it here.

It is an object of my invention to provide a housing for an electric fitting which fitting is composed of mutually insulated electrical devices, the housing being provided with baffling means adapted to cooperate with the fitting in such a manner as to isolate said electrical devices of the fitting in separate compartments of the housing when the fitting is secured therein.

It is an object of this invention to provide a housing for a duplex receptacle with baffling means adapted to cooperate with the receptacle in such a manner as to isolate the two outlets of the receptacle when it is secured to the box.

Other objects and advantages of my invention will occur as my invention is described in connection with the accompanying drawings.

In the drawings:—

Fig. 1 is a plan view of an outlet box and receptacle embodying my invention.

Fig. 2 is a broken cross section view of the invention, taken on line 2—2 of Fig. 1.

Fig. 3 is a broken cross section view of the outlet box used in the invention.

Fig. 4 is a side view of an electric receptacle used in the invention.

Fig. 5 is a cross section view of a modified form of the invention.

Referring to the drawings a conventional outlet box base 10 is provided with a cover 12 having a raised central portion 14 of oblong shape, in the upper surface of which portion is formed an oblong aperture 16. In this aperture 16 a duplex electric receptacle 18 is secured by means of screws 19 passing through the ears 20 of a conventional yoke 21 used with most modern electric receptacles for securing them to their housings. One outlet 22 of the receptacle may be connected to a source of electric energy, for example 110 volt supply. The other outlet 23 of the receptacle may be connected to the aerial and ground of a radio set, for example. Each outlet will have a separate pair of wire terminals 24 located preferably at the side of the receptacle, one terminal of each pair being located on each side.

To separate the box into two compartments, thus isolating the systems of the two outlets, a barrier 26 is united with the cover 12 and occupies a plane transverse thereto at the middle portion of the cover. As will be clearly seen in Figure 4, the upper part of the barrier is recessed, the recess 27 following in a general way the contour of a middle section of a receptacle so that when a receptacle is secured to the cover it will fill up the recess. Alternatively the barrier may be formed integrally with the base or formed separate from the base and cover and secured to either one by any suitable securing means.

As shown in Figure 3, some receptacles have been made heretofore with a transversely extending central barrier 30 secured thereto by having the edges of the barrier engage in slots 32 in the side of the receptacle.

In order that the box may accommodate a receptacle of this type, as well as a conventional duplex receptacle with independent outlets, the barrier 26 of the box is slightly offset from the exact center of the box, thereby the two barriers 30, 26 will lie flush against each other.

As shown in Figure 5, the construction may be modified by omitting barrier 30 and making a barrier 26' to fit into the slots 32, thereby effectively isolating one compartment of the box from the other.

This modified construction is shown in Figure 5 as applied to a wall or switch box the cover to which is the conventional face or flush plate (not shown). However, it is within the scope of my invention to apply this modification to an outlet box, in which case the barrier may be secured in any suitable fashion to either the outlet box cover or the base.

For the purpose of illustration I have shown my invention in connection with an attachment plug receptacle, but the invention is not limited to attachment plug receptacles but may be used in connection with other electrical fittings which consist of mutually insulated electrical devices of which one may or may not be an attachment plug socket or receptacle, as desired.

Obviously many other variations within the scope of my invention will occur to those skilled in the art, therefore I do not limit myself to the invention exactly as shown.

I claim:—

1. A duplex receptacle having independent outlets in combination with a housing for said receptacle comprising base and cover members, baffling means located in the central portion of the housing in a plane transverse to said receptacle and dividing said housing into two isolated compartments, each containing one outlet of the receptacle, said means being secured to said housing.

2. A duplex receptacle having independent outlets in combination with a housing for said receptacle comprising base and cover members, baffling means located in the central portion of the housing in a plane transverse to said receptacle and dividing said housing into two isolated compartments, each containing one outlet of the receptacle, said means being united with one of said housing members.

3. A duplex receptacle having independent outlets in combination with a housing for said receptacle comprising base and cover members, baffling means located in the central portion of the housing in a plane transverse to said receptacle and dividing said housing into two isolated compartments, each containing one outlet of the receptacle, said means being secured to said cover member.

4. A duplex receptacle having independent outlets in combination with a housing for said receptacle comprising base and cover members, baffling means located in the central portion of the housing in a plane transverse to said receptacle and dividing said housing into two isolated compartments, each containing one outlet of the receptacle, said means being secured to said housing and being recessed to accommodate and cooperate with central portion of said receptacle.

5. A duplex receptacle having independent outlets in combination with a housing for said receptacle comprising base and cover members, baffling means located in the central portion of the housing in a plane transverse to said receptacle and dividing said housing into two isolated compartments, each containing one outlet of the receptacle, said means being secured to said housing and being offset from the exact center of said housing.

6. A duplex receptacle having independent outlets in combination with a housing for said receptacle comprising base and cover members, baffling means located in the central portion of the housing in a plane transverse to said receptacle and dividing said housing into two isolated compartments, each containing one outlet of the receptacle, said means being secured to said housing and being offset from the exact center of said housing and also being recessed to accommodate and cooperate with the central portion of said receptacle.

7. A duplex receptacle having independent outlets in combination with a housing for said receptacle comprising base and cover members, baffling means located in the central portion of the housing in a plane transverse to said receptacle and dividing said housing into two isolated compartments, each containing one outlet of the receptacle, said means being secured to said housing and having a recess in its upper portion with a contour like that of the middle section of a receptacle, whereby the receptacle may occupy said recess when the receptacle is secured to the housing.

8. A duplex receptacle having independent outlets in combination with a housing for said receptacle comprising base and cover members, baffling means located in the central portion of the housing in a plane transverse to said receptacle and dividing said housing into two isolated compartments, each containing one outlet of the receptacle, said means being secured to said housing, and said means having a recess with a contour like that of a transverse section of said receptacle whereby the receptacle may occupy and completely fill said recess when the receptacle is secured in position.

9. A duplex receptacle having independent outlets and transverse slots in the opposite sides of said receptacle, in combination with a housing comprising base and cover members, baffling means secured to said housing and located in the central portion thereof in a plane transverse to said receptacle and dividing said housing into two isolated compartments each containing one outlet of the receptacle, said baffling means having edges engaging in said slots.

10. A duplex receptacle having independent outlets and transverse slots in the opposite sides of said receptacle, in combination with a housing comprising base and cover members, baffling means secured to said housing and located in the central portion thereof in a plane transverse to said receptacle and dividing said housing into two isolated compartments each containing one outlet of the receptacle, said baffling means having a recess whose contour is similar to that of a transverse section of said receptacle, the edges of said recess fitting in said slots.

11. A duplex receptacle having independent outlets and a transversely extending plate secured to the central portion thereof, in combination with a housing comprising base and cover members, baffling means secured to said housing and located in the central portion thereof in a plane transverse to said receptacle and dividing said housing into two isolated compartments each containing one outlet of the receptacle, said baffling means having a recess for said receptacle, said plate and baffling means lying adjacent to one another.

12. An electric fitting comprising an insulating body having a plurality of mutually insulated electrical devices mounted therein and adapted to be connected to different electrical systems, in combination with a housing for said fitting comprising base and cover members, baffling means located in the central portion of the housing in a transverse plane and dividing said housing into two isolated compartments, each containing one of said devices, said means being secured to said housing.

13. An electric fitting comprising an insulating body having a plurality of mutually insulated electrical devices mounted therein and adapted to be connected to different electrical systems, in combination with a housing for said fitting comprising base and cover members, baffling means located in the central portion of said housing in a transverse plane dividing said housing into two isolated compartments, each containing one device, said means being secured to the housing and being recessed to accommodate and cooperate with the central portion of the fitting.

14. An electrical fitting comprising an insulating body having mutually insulated electrical devices mounted therein, said body having transverse slots in the opposite sides thereof, in combination with a housing comprising base and cover members, baffling means secured to said housing and located in the central portion thereof in a transverse plane dividing said housing into two isolated compartments, each containing one device, said baffling means engaging in said slots.

In testimony whereof I have signed my name to this specification.

JOHN R. COOK.